(12) United States Patent
Wink et al.

(10) Patent No.: US 11,219,994 B2
(45) Date of Patent: Jan. 11, 2022

(54) HAND TOOL APPARATUS WITH ADAPTIVE ERGONOMIC HANDLE

(71) Applicants: Cherie Yvette Wink, Yorba Linda, CA (US); Petra Beate Wilder Smith, San Juan Capistrano, CA (US)

(72) Inventors: Cherie Yvette Wink, Yorba Linda, CA (US); Petra Beate Wilder Smith, San Juan Capistrano, CA (US)

( * ) Notice: Subject to any disclaimer, the term of this patent is extended or adjusted under 35 U.S.C. 154(b) by 113 days.

(21) Appl. No.: 16/482,819

(22) PCT Filed: Apr. 18, 2019

(86) PCT No.: PCT/US2019/028133
§ 371 (c)(1),
(2) Date: Aug. 1, 2019

(87) PCT Pub. No.: WO2019/204613
PCT Pub. Date: Oct. 24, 2019

(65) Prior Publication Data
US 2020/0376646 A1 Dec. 3, 2020

Related U.S. Application Data

(60) Provisional application No. 62/660,184, filed on Apr. 19, 2018.

(51) Int. Cl.
*B25G 1/10* (2006.01)
*A61C 3/00* (2006.01)
(Continued)

(52) U.S. Cl.
CPC ............... *B25G 1/102* (2013.01); *A61C 3/00* (2013.01); *B25G 1/02* (2013.01); *B25G 1/06* (2013.01)

(58) Field of Classification Search
CPC ... E05D 5/0246; E05D 5/0253; E05D 5/0261; E05D 5/0269; E05D 2005/0263;
(Continued)

(56) References Cited

U.S. PATENT DOCUMENTS 2,814,322 A * 11/1957 Kupfrian ............... B25B 13/481
81/64
3,203,285 A * 8/1965 Schmidt ................. B25G 1/025
81/177.6
(Continued)

FOREIGN PATENT DOCUMENTS

DE 10004354 A1 * 8/2001 ............. A47K 11/10
EP 3269272 A1 1/2018
(Continued)

OTHER PUBLICATIONS

International Search Report and Written Opinion, PCT/US2019/028133, dated Jul. 10, 2019.

*Primary Examiner* — Chuck Y Mah
(74) *Attorney, Agent, or Firm* — Entralta P.C.; Justin G. Sanders (57) ABSTRACT

A hand tool apparatus is disclosed as providing an elongate, adaptive ergonomic handle portion. In at least one embodiment, the handle portion provides a pair of opposing handle ends. At least one of the handle ends provides an instrument portion. An at least one bendable core is positioned between the handle ends, the at least one core capable of being selectively bent into a variety of desired shape configurations, and substantially maintaining those shape configurations until the core is intentionally bent into a different desired shape configuration. As a result, the handle portion is capable of ergonomically conforming to a hand of a user while shifting a weight of the apparatus and encouraging proper positioning of the instrument portion during use of
(Continued)

the apparatus, regardless of the specific procedure to be performed using the apparatus.

19 Claims, 7 Drawing Sheets

(51) Int. Cl.
  *B25G 1/02* (2006.01)
  *B25G 1/06* (2006.01)
(58) Field of Classification Search
  CPC .... E05D 2005/0261; E05D 2005/0269; E05D 7/081; E05D 7/08; E05D 2003/027; E05Y 2900/114; E05Y 2600/502; E05Y 2600/60; E05F 1/1215; E05F 1/12; E05F 1/1207; E05F 3/20; E05F 3/18; E05F 11/385; E06B 3/54; A47K 3/362; A47K 2003/367; A47F 3/12; A47F 3/125; Y10T 16/534; Y10T 16/5383; Y10T 16/53828; Y10T 16/53845
  See application file for complete search history.

(56) References Cited

U.S. PATENT DOCUMENTS

| | | | | |
|---|---|---|---|---|
| 3,585,885 A * | 6/1971 | Carr | .................. | B25G 1/02 81/57 |
| 4,030,199 A * | 6/1977 | Russell | .................. | A46B 7/04 433/147 |
| 4,266,588 A * | 5/1981 | Tudisco | .................. | B25G 1/01 81/22 |
| 4,820,153 A | 4/1989 | Römhild et al. | | |
| 5,380,200 A * | 1/1995 | Heath | .................. | A61C 5/42 433/102 |
| 5,397,304 A * | 3/1995 | Truckai | .................. | A61M 25/0138 604/528 |
| 5,455,997 A * | 10/1995 | Nasiell | .................. | B25B 13/481 29/456 |
| 6,004,329 A * | 12/1999 | Myers | .................. | A61F 2/2427 294/24 |
| 6,322,362 B1 * | 11/2001 | Holms | .................. | A61C 3/00 433/141 |
| 6,328,494 B1 * | 12/2001 | Moxon | .................. | B43K 5/005 15/443 |
| 6,527,464 B2 * | 3/2003 | Lee | .................. | B43K 5/005 401/16 |
| 6,729,877 B2 * | 5/2004 | Rahman | .................. | A61C 3/00 433/141 |
| 6,974,416 B2 * | 12/2005 | Booker | .................. | A61B 8/06 600/459 |
| 7,100,238 B2 * | 9/2006 | McCauley | .................. | A61C 3/00 433/143 |
| 8,167,616 B2 * | 5/2012 | Jamnia | .................. | A61C 3/00 433/143 |
| 8,651,862 B2 | 2/2014 | Solomon | | |
| 8,807,615 B2 * | 8/2014 | Kovarik | .................. | B25J 1/00 294/209 |
| 9,182,077 B2 * | 11/2015 | Dose | .................. | B60R 11/02 |
| 2004/0248063 A1 * | 12/2004 | Willat | .................. | A61B 1/24 433/141 |
| 2006/0084032 A1 * | 4/2006 | Tipton | .................. | A61C 3/00 433/141 |
| 2007/0127973 A1 * | 6/2007 | Comstock | .................. | B43K 23/004 401/6 |
| 2008/0131842 A1 * | 6/2008 | Edwards | .................. | A46B 5/02 433/215 |
| 2011/0042530 A1 * | 2/2011 | Phillips | .................. | F16M 13/022 248/121 |
| 2013/0104326 A1 * | 5/2013 | Gooden | .................. | A47L 13/38 15/105 |
| 2014/0137352 A1 * | 5/2014 | Golla | .................. | A47K 7/028 15/160 |
| 2015/0230811 A1 * | 8/2015 | Kovarik | .................. | A61B 1/24 433/29 |
| 2016/0039129 A1 * | 2/2016 | Hou | .................. | A47G 21/02 76/104.1 |
| 2016/0067026 A1 | 3/2016 | Esfandiari | | |

FOREIGN PATENT DOCUMENTS

| | | | | |
|---|---|---|---|---|
| GB | 2466770 A * | 7/2010 | .......... | B25B 13/481 |
| JP | 3212653 U * | 9/2017 | | |

* cited by examiner

HAND TOOL APPARATUS WITH ADAPTIVE ERGONOMIC HANDLE

RELATED APPLICATIONS

This application is a 35 U.S.C. 371 US national stage entry and is entitled to the earliest effective filing date of international application number PCT/US2019/028133, filed on Apr. 18, 2019, which itself claims priority to U.S. provisional application Ser. No. 62/660,184, filed on Apr. 19, 2018. The contents of the aforementioned applications are incorporated herein by reference.

BACKGROUND

The subject of this patent application relates generally to hand tools, and more particularly to a hand tool apparatus having an adaptive ergonomic handle.

Applicant(s) hereby incorporate herein by reference any and all patents and published patent applications cited or referred to in this application.

By way of background, development of musculoskeletal disorders ("MSD") is a significant, well-documented problem in the profession of dentistry and dental hygiene with 64%-93% of clinicians experiencing pain. According to the Bureau of Labor Statistics in 1998, dental hygienists rank first amongst all occupations in the U.S. for the highest number of carpal tunnel syndrome cases per 1,000 employees, particularly due to multiple forms of instrumentation fatigue, which affects treatment quality, efficacy, and a hygienist's ability to work a full day/week. The adverse consequences of existing instrument design on the anatomy of the hand, wrist and forearm include conditions such as arthritis, trigger finger and hyperlaxity caused by weakened or stretched ligaments. Individuals with a joint hyperlaxity condition in their fingers will have difficulty grasping an instrument without having the thumb collapse or hyperextend on the instrument. Ulnar nerve neuropathy or dysfunction, tendonitis, and thoracic outlet syndrome are additional musculoskeletal injuries commonly seen in dental care providers. With hands being the most important asset of oral health care providers ("OHCP"), maintaining proper and optimal ergonomic practices is crucial to career longevity, treatment efficacy and clinician health.

Fundamentals of scaling and root debridement are broken down into components such as grasp, fulcrum, blade adaptation, angulation, and stroke. Each component of this intricate task works collectively to achieve optimal function and efficacy during the instrumentation process. The modified pen grasp involves specific finger positioning in relationship to the periodontal curette to lessen musculoskeletal stress and the incidence of injury. This grasp is much more intricate than the way a pen is held. The thumb and index finger should be positioned opposite one another, allowing for control and balance of the instrument handle. The middle finger is placed on the lower shank to feel or receive vibrations transmitted from the working end while the ring finger functions to stabilize and support hand control and improve strength during instrumentation. The pad of the ring finger also functions for fulcrum placement allowing for pivoting and rotation. The middle and ring fingers should be in contact during a modified pen grasp to provide increased stability and strength. Other grasps such as the inverted pen, palm and thumb and modified palm and thumb grasps all require some level of force transfer onto the rigid instrument handle.

Despite recommendations by instrumentation experts to avoid doing so, dental clinicians often split their fulcrum fingers, or veer from the adopted techniques of their grasp, to improve access or achieve acceptable blade to tooth angulation in hard to reach areas, and to attempt to overcome the rigidity, shape and geometry of instrument handles. This increases their risk for developing a MSD. Splitting the fourth finger from the middle finger or allowing the joint of the index finger or thumb to collapse weakens the ability to apply adequate lateral pressure to the tooth surface, compromising the ability to remove calcified deposits efficiently and completely from the surfaces of a tooth. Additionally, such malpositioning may cause an instrument to become unbalanced in the hand, increasing the amount of muscle tension required to keep the curette balanced and positioned with the terminal shank parallel to the long axis of the tooth.

Each part of a curette or other dental instrument plays a specific role in the overall desired clinical effect. Studies show that weight distribution, diameter, cold and rigid instrument handle materials have a direct effect on pain experiences in fingers, hand, arm and shoulder. An incorrect grasp on a rigid, non-formable curette handle may lead to the finger pads lifting off the instrument and difficulty controlling it. When engaging a working stroke, the instrument handle should be balanced in the dorsal first inter-digital space of the hand allowing for stabilization of the instrument.

Successful instrumentation techniques depend on the precise adaptation of the blade to the tooth. Site-specific curettes have a variety of shank designs for this very reason. For optimal outcomes, it is recommended that the terminal shank be held parallel to the long axis of the tooth in most posterior regions of the mouth. With this, the face of the blade is offset at approximately 60-70 degrees for optimal performance against the tooth. While this vertical positioning of the terminal shank is consistently taught as proper adaptation, achieving this angle is not always possible. Many anatomical variations and conditions, including small mouths, large teeth, tooth malpositioning, and patients with restricted opening due to temporomandibular disorders, trismus, and other disorders may present obstacles in achieving this angulation. Activation of the curette at an improper angulation leads to incomplete removal of calculi and the potential of burnishing deposits into the root surface instead of removing them. Other dental and surgical instruments can present challenges with proper adaptation, accessibility and ergonomics as well.

In an attempt to achieve proper angulation of the instrument or curette blade on the tooth under clinical conditions with poor accessibility, the clinician may compromise their fulcrum, grasp, wrist, shoulder, or neck positioning to achieve proper adaptation of the curette blade to the tooth. A neutral wrist aligns with proper ergonomics, but in challenges as mentioned above, the clinician may need to bend or kink the wrist to access hard to reach areas. Bending the hand at the wrist during instrumentation may lead to compression of the median nerve within the carpal tunnel of the wrist. It is this repeated pressure on the median nerve that can lead to carpal tunnel syndrome, causing numbness and tingling in the thumb, index, and middle fingers and/or weakness in the lower arm or wrist. Tendinitis may result when the tendons of the wrist become inflamed due to extending the hand up or down at the wrist repeatedly. Twisting the hand, grasping instruments too tightly, and bending the hand back or to the left or right may cause the tendons on the side of the wrist and the base of the thumb to become inflamed, leading to tenosynovitis. Improper ergonomics have also been associated with the development of thoracic outlet syndrome, bursitis, extensive wad strain, and disc herniation.

Figure 1:
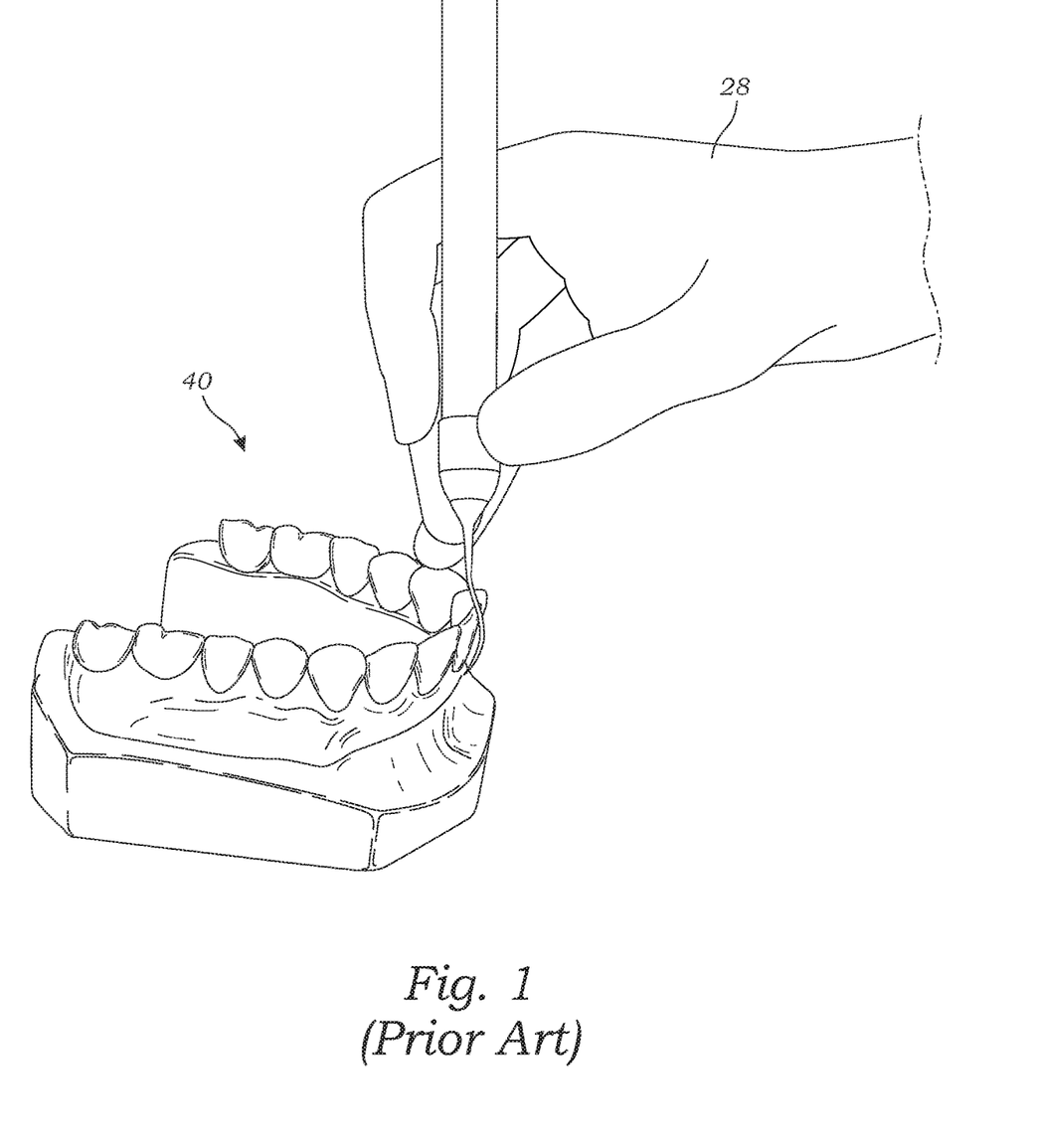
FIG. 1 is a perspective view of a prior art dental curette.

During instrumentation, the wrist must be kept neutral, as pictured in FIG. 1, to prevent musculoskeletal injury during stroke engagement and activation. FIG. 1 demonstrates a proper neutral (straight) wrist position and proper blade to tooth adaptation; however, again, various patient anatomical and clinical conditions may present challenges to achieving and maintaining such positions during instrumentation, as discussed above.

Handles with lighter weight enhance tactile sensitivity and lessen fatigue. The diameter of curette handles varies widely, typically measuring between 6.5 mm to 11 mm. Instruments with small diameter handles increase muscle activity and the force needed to hold the instrument (pinch force), which over time can lead to premature fatigue and injuries. There is a limited effect of handle diameter, with handles larger than 10 mm having no additional benefits in reducing muscle activity. Therefore, simply increasing instrument handle diameter alone is not a solution to all of the above-mentioned problems.

With all of that said, there remains a need for manual or hand-held instruments that are capable of reducing muscle activity by adjustably molding to the shape of the user's hand, based on where and in which direction force is to be applied with the hand tool, thereby reducing the amount of muscle engagement and pinch force required to operate the hand tool which, in turn, reduces user fatigue, discomfort and injury, and encourages proper hand tool positioning. There currently exits no feature that allows the clinician to shift the weight of the instrument more favorably to reduce the muscle engagement and activity required to hold the handle upright and the entire instrument in the ideal configuration. Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a hand tool apparatus having an elongate, adaptive ergonomic handle portion. In at least one embodiment, the handle portion provides a pair of opposing handle ends. At least one of the handle ends provides an instrument portion. An at least one bendable core is positioned between the handle ends, the at least one core capable of being selectively bent into a variety of desired shape configurations, and substantially maintaining those shape configurations until the core is intentionally bent into a different desired shape configuration. As a result, the handle portion is capable of ergonomically conforming to a hand of a user while shifting a weight of the apparatus and encouraging proper positioning of the instrument portion during use of the apparatus, regardless of the specific procedure to be performed using the instrument. Thus, the apparatus—in at least one embodiment—is capable of overcoming the limitations and properties of conventional rigid handles to reduce adverse factors that cause fatigue and repetitive stress injuries, along with other adverse effects such as points of pressure, the amount of force needed to achieve clinical outcomes, finger and hand loading, angulation and configuration, as well as body posture, loading and angulation.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 2:
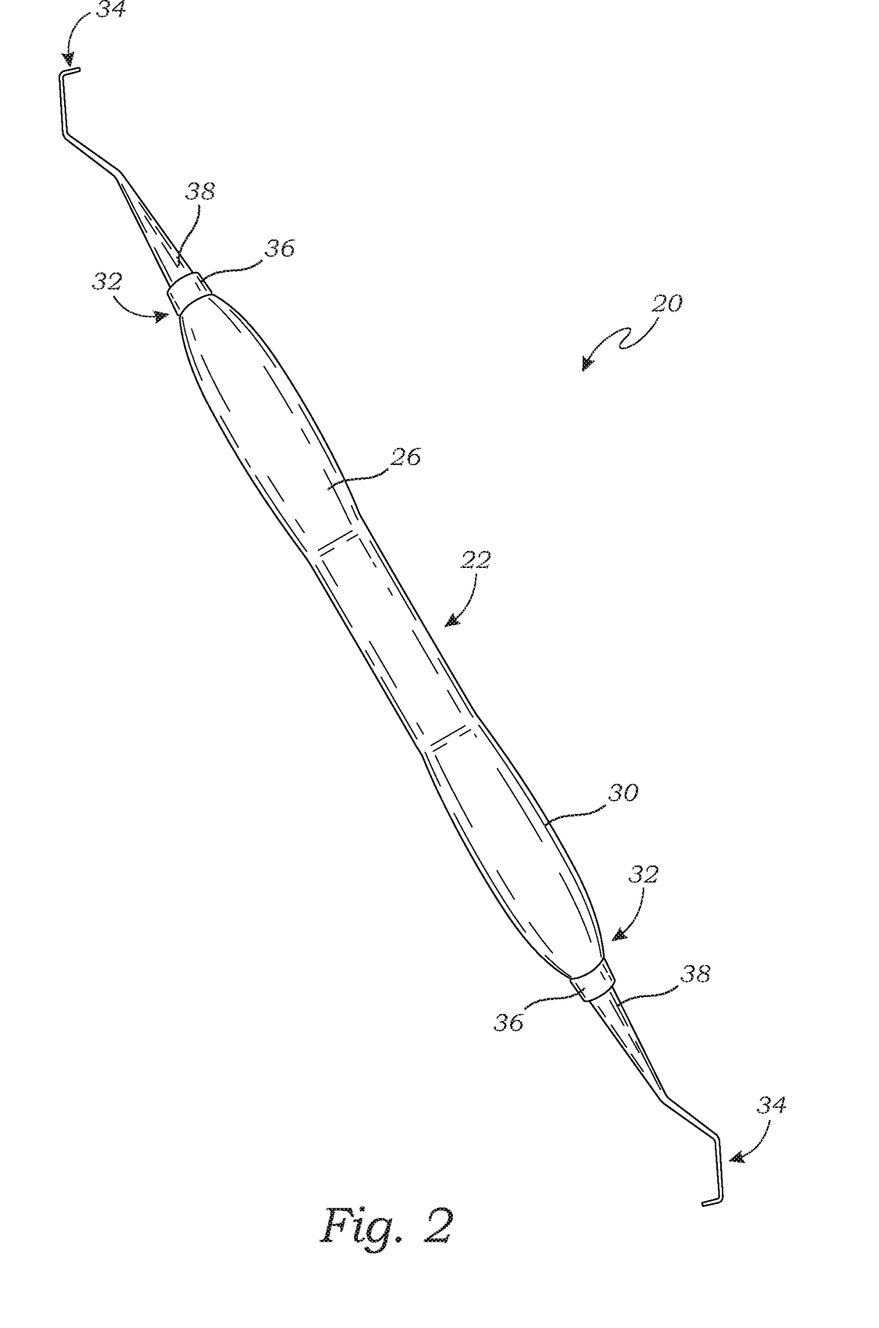
FIG. 2 is a perspective view of an exemplary hand tool apparatus, in the form of a dental curette, in accordance with at least one embodiment.
Figure 3:
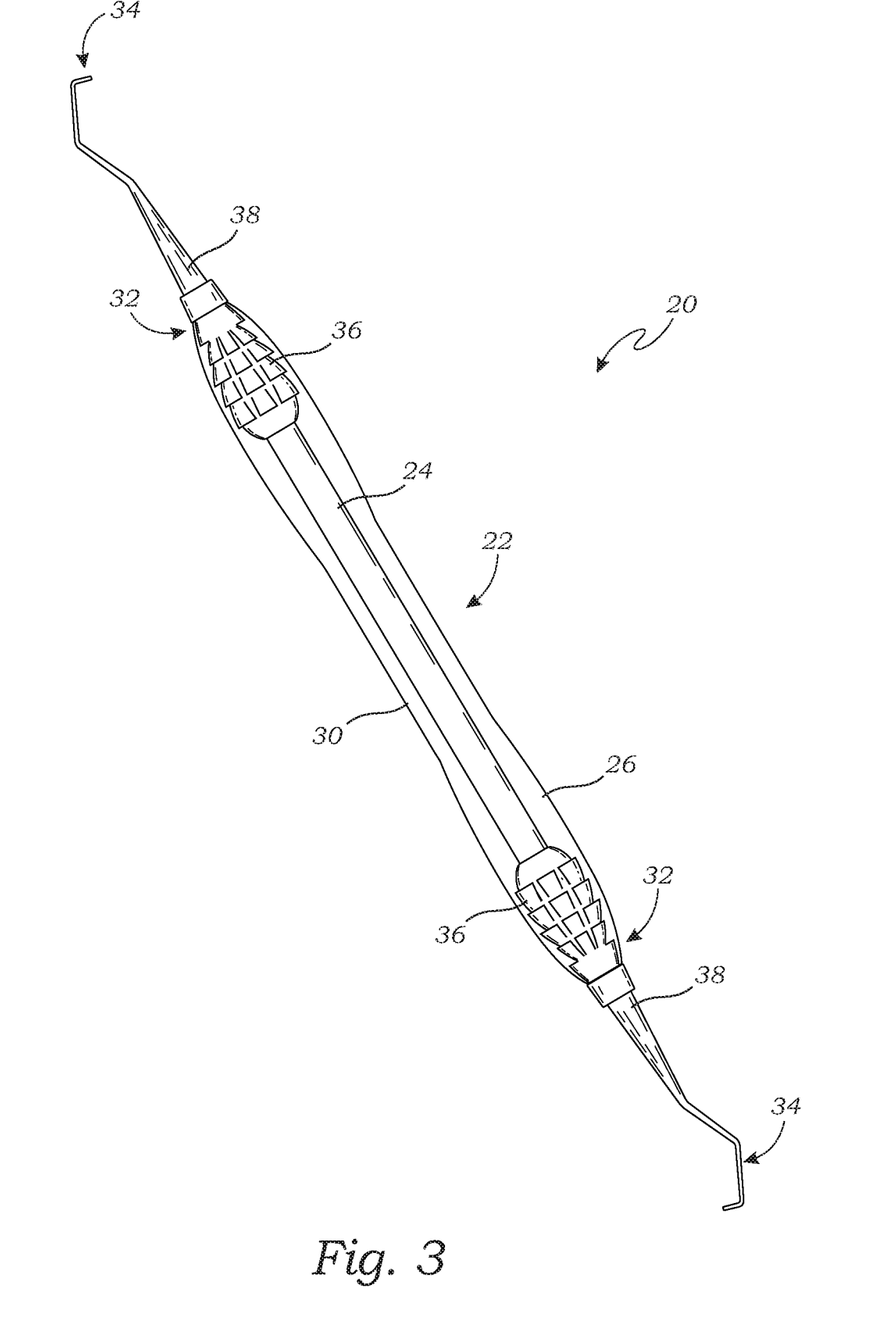
FIG. 3 is a further perspective view thereof, with a grip portion of a handle portion of the apparatus shown as being transparent for illustrative purposes, in accordance with at least one embodiment.
Figure 4:
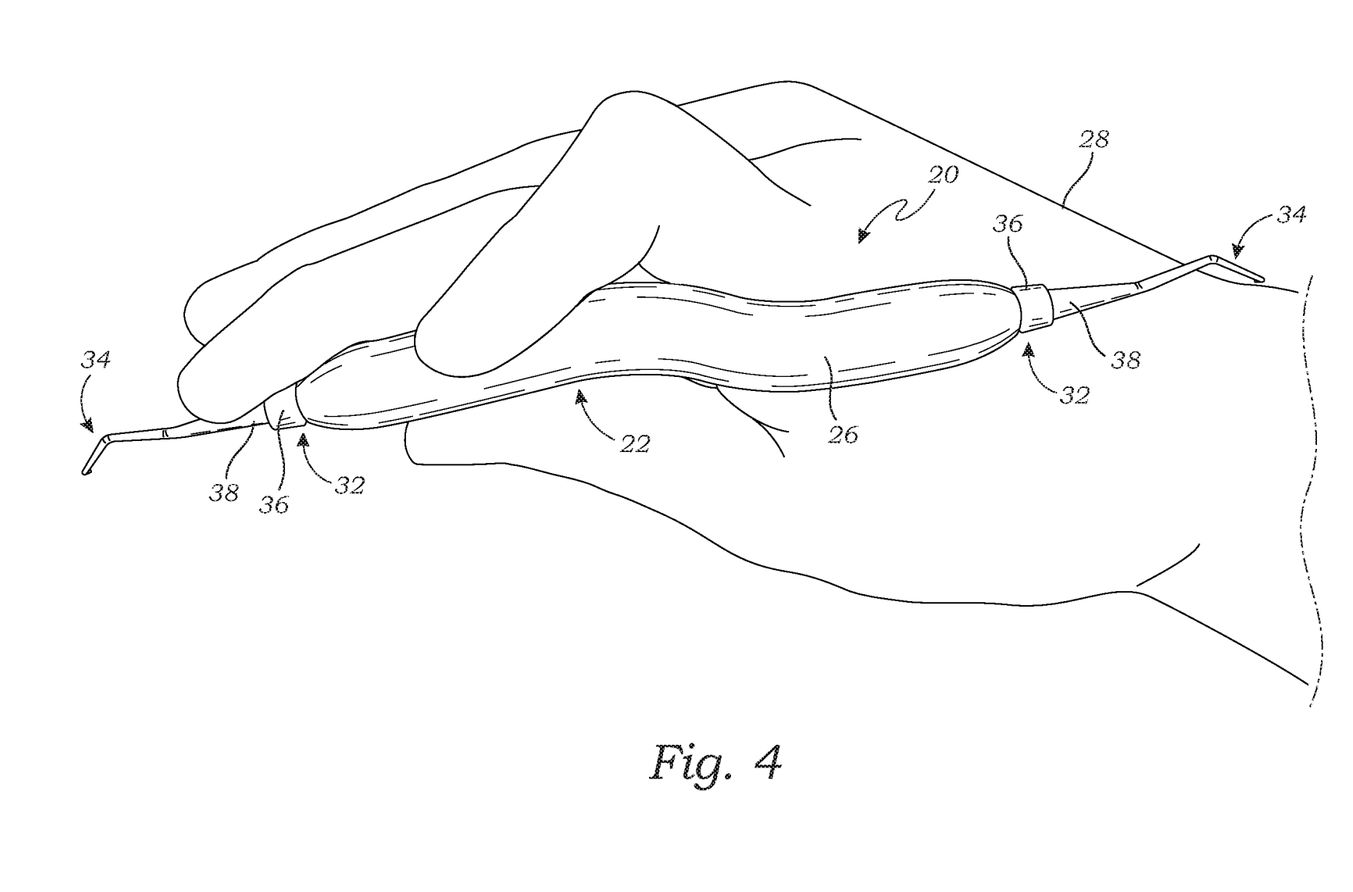
FIGS. 4-7 are perspective views of the exemplary hand tool apparatus in use, in accordance with at least one embodiment.
Figure 5:
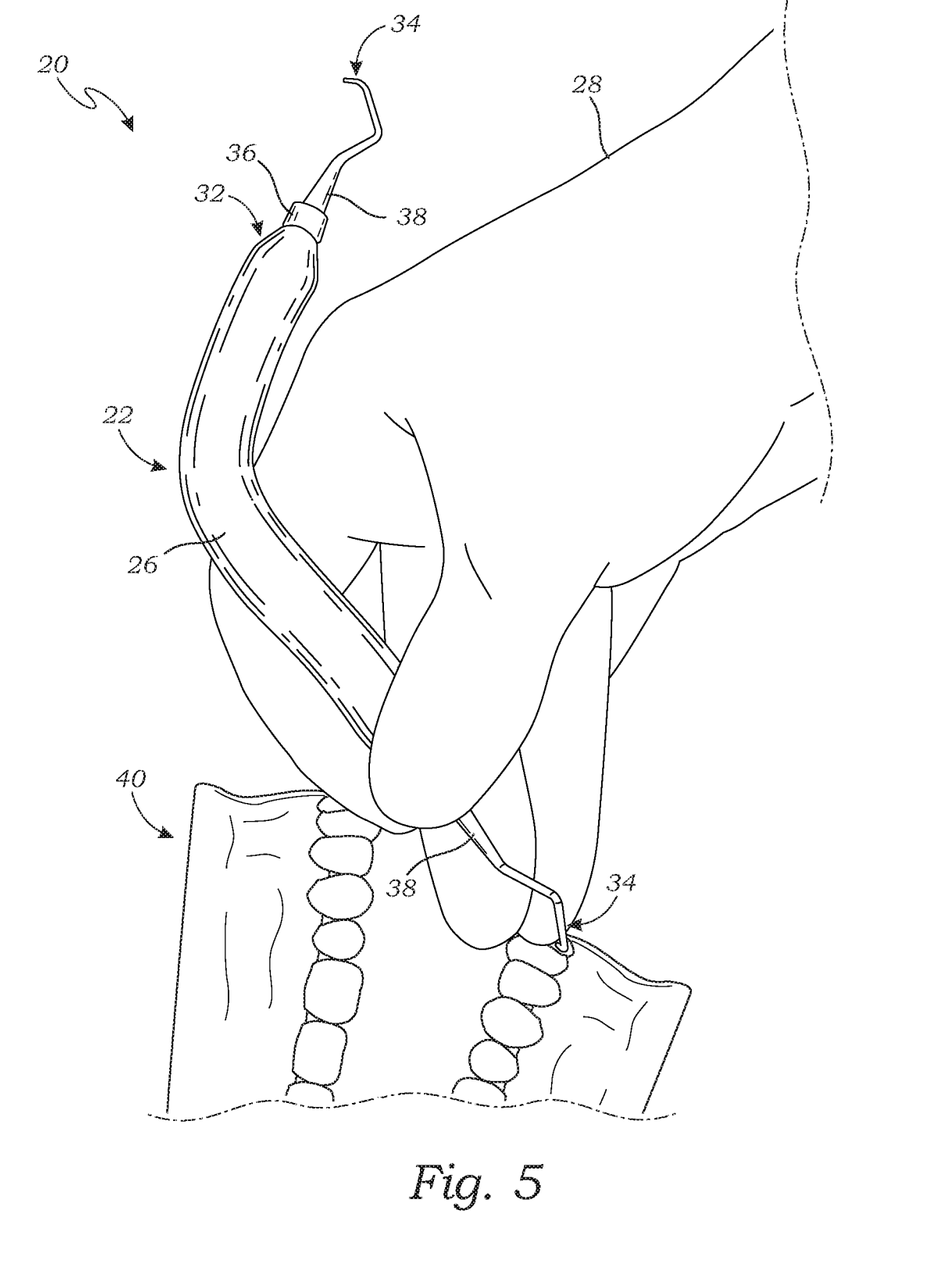
Figure 6:
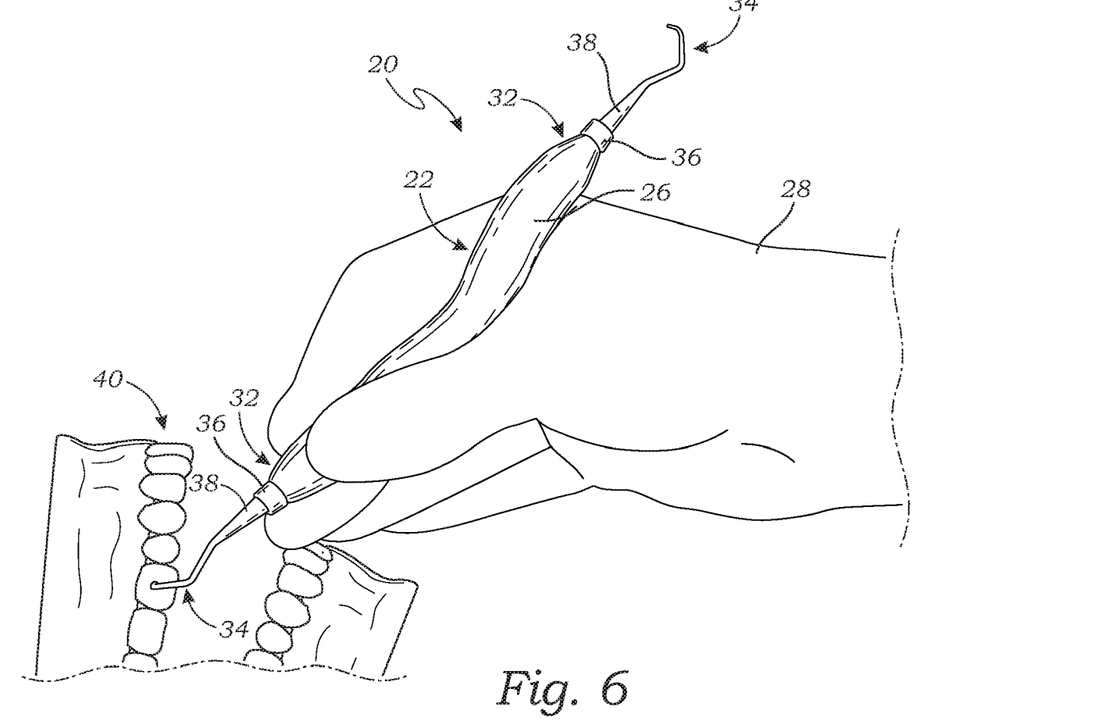
Figure 7:
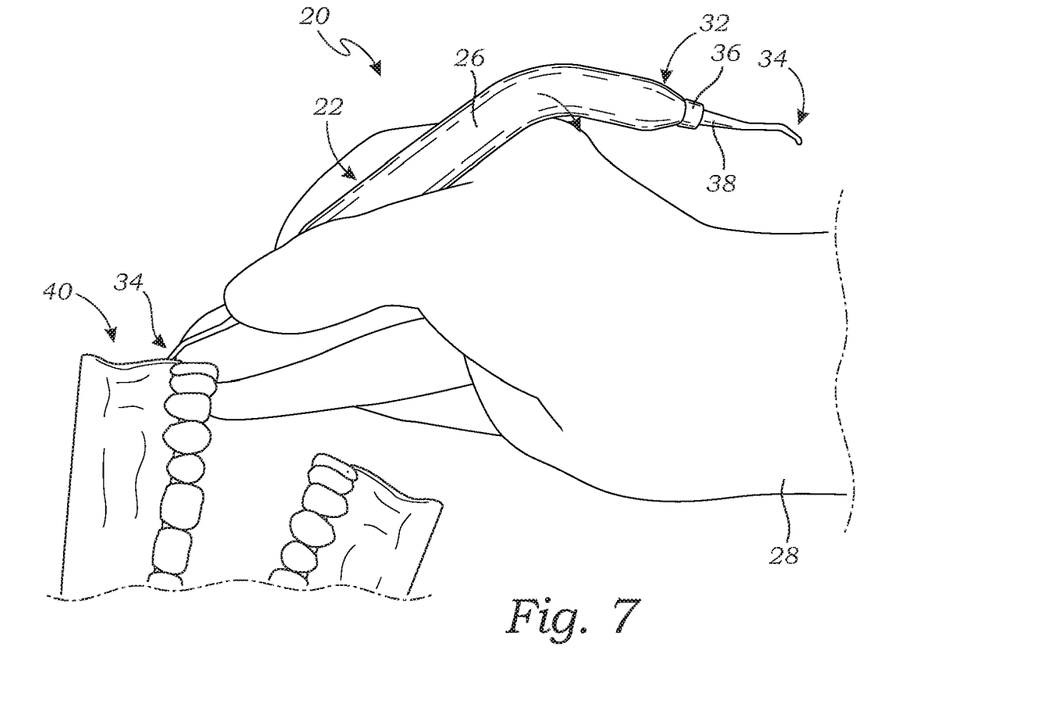

Turning now to FIGS. 2 and 3, there are shown perspective views of an exemplary embodiment of a hand tool apparatus 20 having an elongate, adaptive ergonomic handle portion 22, with the apparatus 20 being configured as a dental curette in this particular embodiment. At the outset, it should be noted that while the apparatus 20 is depicted as a dental curette in the accompanying drawing figures for illustrative purposes, in further embodiments, the apparatus 20 may be configured as any other type of hand tool, now known or later developed, for virtually any industry where the need for such an adaptive ergonomic handle portion 22 exists. Thus, the present invention should in no way be limited to the dental curette context, nor even to the dental industry.

Figure 8:
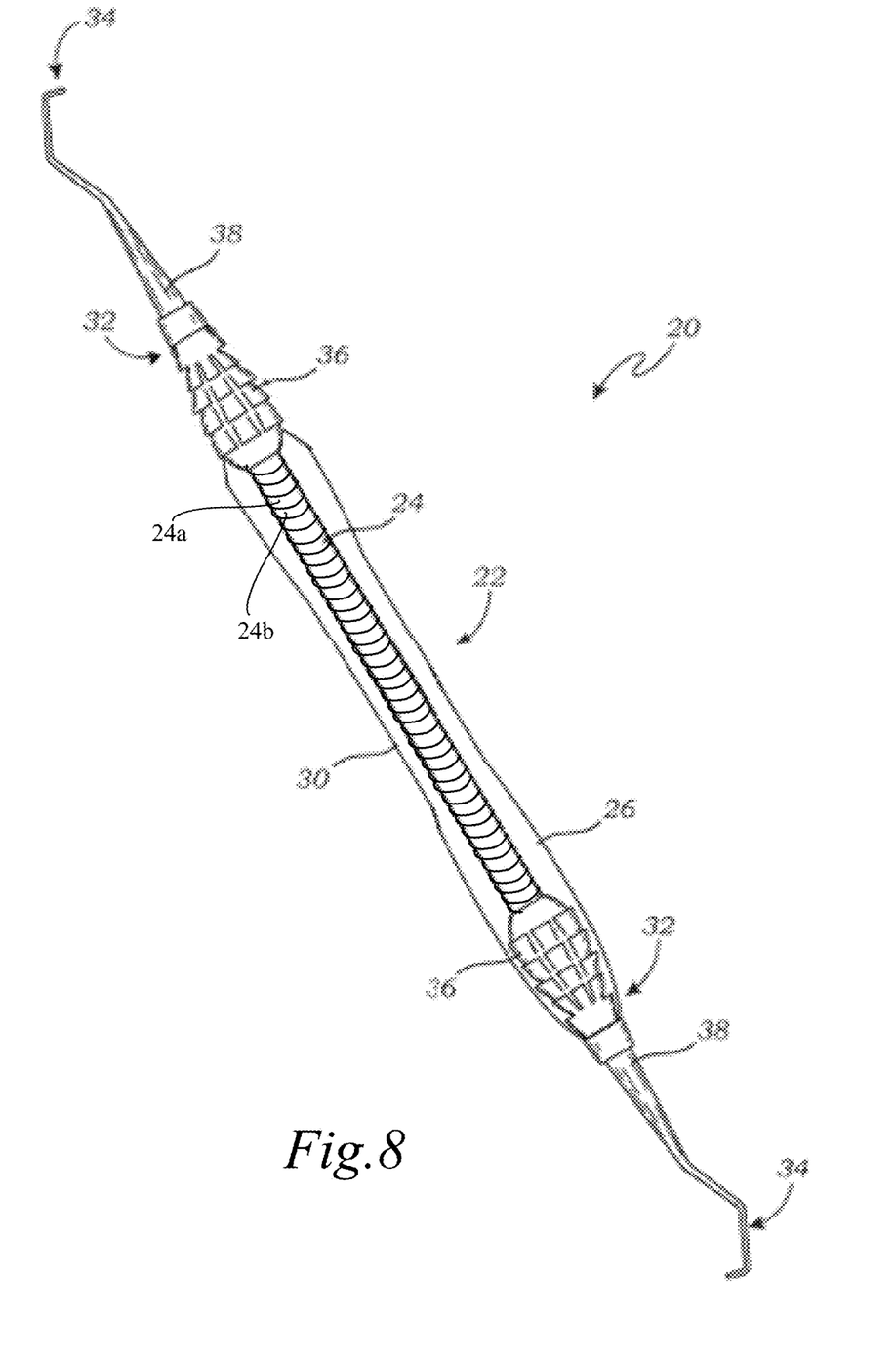
FIG. 8 is a perspective view of an exemplary hand tool apparatus, with a grip portion of a handle portion of the apparatus shown as being transparent for illustrative purposes, in accordance with at least one embodiment.

In at least one embodiment, the elongate handle portion 22 of the apparatus 20 provides a selectively bendable core 24. In at least one such embodiment, the core 24 is encased within a resilient, deformable grip portion 26—as best shown in FIG. 3, with the grip portion 26 depicted as being transparent in that figure for illustrative purposes. In at least one embodiment, the core 24 is capable of being selectively bendable into a variety of desired shape configurations, and substantially maintaining those shape configurations, in order for the handle portion 22 to ergonomically conform to a hand 28 of a user during use of the apparatus 20 (as illustrated in FIGS. 4-7), while also strategically shifting the weight of the apparatus 20—regardless of the specific type of hand tool that the apparatus 20 is configured as, and regardless of the specific procedure to be performed using the apparatus 20 (including where and in which direction force is to be applied with the apparatus 20). As a result, the ergonomic configurability along with the selective weight shifting of the apparatus 20 allows for the engagement of relatively larger muscle groups in the user's arm in lieu of wrist and/or finger action. Furthermore, utilization of such larger muscle groups facilitates more power while also making the user less susceptible to MSD injury. Additionally, in at least one embodiment, the core 24 is constructed out of a material (or combination of materials) that is capable of withstanding repeated heat sterilization and does not fatigue through being repeatedly bent or molded into a number of different shape configurations over time. In at least one such embodiment, the core 24 is constructed out of an annealed stainless allow, such as a 316LVM 0.064 annealed stainless alloy, a 316LVM 0.072 super annealed stainless alloy, or a MP35N stainless alloy, for example. In further embodiments, the core 24 may be constructed out of any other materials (or combinations of materials), now known or later developed, that are capable of allowing the core 24 to substantially carry out the functionality described herein. In at least one embodiment, the core 24 is constructed as either a single wire-shaped structure or a multi-stranded wire-shaped structure. In at least one further embodiment, the core 24 is constructed as a coil-shaped structure. As best shown in FIG. 8, the core 24 comprises a first strand 24a and a second strand 24b in a multi-stranded wire-shaped structure in the form of a coil-shaped structure. In still further embodiments, the core 24 may be constructed as any other shapes (and having any other dimensions), now known or later developed, that are capable of allowing the core 24 to substantially carry out the functionality described herein. Again, in such embodiments, not only is the core 24 capable of being selectively bendable into a variety of desired shape configurations, but it is also capable of substantially maintaining those shape configurations during use of the apparatus 20—even where lateral pressure is applied to the apparatus 20 while the user is performing a particular procedure—until the user intentionally bends the core 24 into a different desired shape configuration. In at least one embodiment, the core 24 is sized and configured for being selectively bent and re-shaped single-handedly (i.e., using only one of the user's hands) for ease of use.

In at least one further embodiment (not shown), the handle portion 22 provides two or more selectively bendable cores 24 encased within the grip portion 26—the cores 24 being connected to one another in series by a rigid, substantially unbendable material positioned therebetween.

With continued reference to FIGS. 2 and 3, in at least one embodiment, the grip portion 26 encases the core 24 and extends the entire length of the handle portion 22 to allow for standard precautions of infection control practices (at least where the apparatus 20 is configured for use in such scenarios), configured in such a way as to avoid penetration or collection of infectious and other materials. In at least one alternate embodiment, the grip portion 26 extends less than the entire length of the handle portion 22. In at least one embodiment, the grip portion 26 is constructed out of a material (or combination of materials) that is relatively soft, lightweight and thermally insulated in order to increase comfort and reduce muscle activity in the user's hand 28 during use of the apparatus 20, while also preserving manual dexterity and reducing symptoms of nerve impairment that are often caused by the low temperatures of direct finger-to-steel contact. Additionally, in at least one embodiment, where the apparatus 20 is configured as a hand tool that is to be used on or near human tissue, the grip portion 26 is constructed out of a material that is compatible with human tissue and body fluids, with said material being odorless, tasteless and capable of preventing bacteria growth thereon. Additionally, in at least one embodiment, the grip portion 26 is constructed out of a material (or combination of materials) that is capable of withstanding repeated heat sterilization. In at least one such embodiment, the grip portion 26 is constructed out of a silicone, such as a silicone having a shore hardness of 20-35+/−5 on the Shore A scale, for example. In further embodiments, the grip portion 26 is constructed out of a rubber/elastomer, or a plastic material. In still further embodiments, the grip portion 26 may be constructed out of any other materials (or combinations of materials), now known or later developed, that are capable of allowing the grip portion 26 to substantially carry out the functionality described herein. In at least one embodiment, the grip portion 26 is constructed as an elongate, substantially cylindrical-shaped structure. In further embodiments, the grip portion 26 may be constructed as any other shapes (and having any other dimensions), now known or later developed, that are capable of allowing the grip portion 26 to substantially carry out the functionality described herein. Additionally, in at least one embodiment, an outer surface 30 of the grip portion 26 may be textured for improving grip.

With continued reference to FIGS. 2 and 3, in at least one embodiment, the handle portion 22 provides a pair of opposing, relatively rigid handle ends 32. In at least one such embodiment, at least one of the handle ends 32 provides an instrument portion 34. In that regard, again, while the instrument portion 34 is depicted as a dental curette in the accompanying drawing figures for illustrative purposes, in further embodiments, the instrument portion 34 may take on any other type of hand tool configuration, now known or later developed. For example, where the apparatus 20 is used in a dental context, the instrument portion 34 may be further configured as a mirror, a periodontal curette, a surgical curette, an elevator, a micro surgery or carving instrument, a bone file, an excavator, a root tip pick, extraction forceps, an endodontic instrument, a cavity preparation instrument, a brush, etc. In still further embodiments, the instrument portion 34 may take on any other type of hand tool configuration, now known or later developed, for virtually any industry where the need for such an adaptive ergonomic hand tool apparatus 20 exists. Thus, again, the present invention should in no way be limited to the dental curette context, nor even to the dental industry. In at least one further embodiment, both handle ends 32 provide an instrument portion 34—either the same type of instrument portion 34 or different types of instrument portions 34.

In at least one embodiment, the instrument portion 34 is integral with, or otherwise permanently engaged with, the corresponding handle end 32. In at least one alternate embodiment, the instrument portion 34 is removably engaged with the corresponding handle 15 end 32. In at least one such embodiment, as illustrated best in FIG. 3, the corresponding handle end 32 provides a tool receiver 36 configured for removably receiving a shank 38 of the instrument portion 34. In at least one such embodiment, the tool receiver 36 is constructed out of a material (or combination of materials)—such as a relatively lightweight metal, polycarbonate or plastic, for example—that is capable of distributing any vibrations to the 20 shank 38 of the instrument portion 34, thereby allowing for tactile feedback while substantially preventing transmission of vibrations to the user's hand 28 via the handle portion 22. Additionally, in at least one embodiment, the tool receiver 36 enables the apparatus 20 to maintain a sufficient amount of rigidity at the shank 38 so as to allow the user to utilize the instrument portion 34 in an ergonomic yet effective manner. Additionally, in at least one embodiment, the tool receiver 36 comprises a rigid structure. The rigid structure may have a variable outer diameter along a length of the rigid structure. The rigid structure may have a variable outer diameter that creates a bolbus profile. The rigid structure may have a serrated surface. In further embodiments, the tool receiver 36 may be constructed out of any other materials (or combinations of materials), now known or later developed, that are capable of allowing the tool receiver 36 to substantially carry out the functionality described herein. Additionally, in at least one embodiment, the at least one tool receiver 36 is substantially encased within the grip portion 26, thereby sealing off the interface between the core 24 and the at least one tool receiver 36 so as to better prevent any collection of potentially infectious materials at said interface and to permit routine sterilization of the apparatus 20. In still further embodiments, any other mechanism (or combination of mechanisms), now known or later developed, capable of achieving a removable engagement between the instrument portion 34 and the corresponding handle end 32, may be substituted.

As mentioned above, the particular sizes, shapes and dimensions of the various components of the apparatus 20 described above and depicted in the accompanying drawings are merely exemplary. In practice, these components may take on any other size, shape or dimensions, now known or later developed—dependent, at least in part, on the specific type of hand tool that the apparatus 20 is configured as, as well as the specific procedure to be performed using the apparatus 20—in order to optimize grip, ergonomics, reach and any other clinical requirements for a given use case. As a result, and as illustrated in the exemplary use cases of FIGS. 4-7, the apparatus 20 is capable of adjustably molding to the shape of the user's hand 28, based on where and in which direction force is to be applied with the instrument portion 34, thereby strategically shifting the weight of the apparatus 20 and reducing the amount of muscle engagement and pinch force required to operate the instrument portion 34 which, in turn, reduces user fatigue, discomfort and injury (that are often caused by the grip and force transfer limitations of traditional, relatively rigid hand tool handles), and encourages proper positioning of the instrument portion 34. Additionally, in at least one embodiment, the capacity for selective shaping of the apparatus 20 (by virtue of the selective bendability of the handle portion 22) allows for better visual access into an operating site (i.e., the location in which the instrument portion 34 is being used)—such as a mouth 40 of a patient, for example—while also permitting non-linear universal access into the operating site. As a result, in at least one embodiment, the apparatus 20 is capable of maximizing the access, functionality, effectiveness and reach of the instrument portion 34 while improving ergonomics and reducing muscle fatigue. Thus, in at least one such embodiment, the apparatus 20 provides a solution for instrumentation on patients who have a limited opening, such as pediatrics, trismus, arthritic temporomandibular joints, and any other systemic conditions that may affect the patient's ability to open their mouth widely.

Aspects of the present specification may also be described as the following embodiments:

1. A hand tool apparatus comprising: an elongate, adaptive ergonomic handle portion comprising: a pair of opposing handle ends; at least one of the handle ends providing an instrument portion; and an at least one bendable core extending between the handle ends, the at least one core capable of being selectively bent into a variety of desired shape configurations, and substantially maintaining those shape configurations until the core is intentionally bent into a different desired shape configuration; whereby, the handle portion is capable of ergonomically conforming to a hand of a user while shifting a weight of the apparatus and encouraging proper positioning of the instrument portion during use of the apparatus, regardless of the specific procedure to be performed using the apparatus.

2. The hand tool apparatus according to embodiment 1, wherein the core is constructed out of an at least one material that is capable of withstanding repeated sterilization and being repeatedly bent or molded into a number of different shape configurations over time.

3. The hand tool apparatus according to embodiments 1-2, wherein the core is constructed out of an annealed stainless alloy.

4. The hand tool apparatus according to embodiments 1-3, wherein the core is constructed out of at least one of a 316LVM 0.064 annealed stainless alloy, a 316LVM 0.072 super annealed stainless alloy, and a MP35N stainless alloy.

5. The hand tool apparatus according to embodiments 1-4, wherein the core is constructed as one of a single wire-shaped structure, a multi-stranded wire-shaped structure, and a coil-shaped structure.

6. The hand tool apparatus according to embodiments 1-5, wherein the handle portion comprises two or more bendable cores encased within the grip portion, the cores being connected to one another in series by a rigid, substantially unbendable material positioned therebetween.

7. The hand tool apparatus according to embodiments 1-6, wherein the handle portion further comprises a deformable grip portion encasing the at least one core.

8. The hand tool apparatus according to embodiments 1-7, wherein the grip portion extends an entire length of the handle portion.

9. The hand tool apparatus according to embodiments 1-8, wherein the grip portion extends less than an entire length of the handle portion.

10. The hand tool apparatus according to embodiments 1-9, wherein the grip portion is constructed out of an at least one material that is relatively soft, lightweight and thermally insulated.

11. The hand tool apparatus according to embodiments 1-10, wherein the grip portion is constructed out of an at least one material that is compatible with human tissue and body fluids, with said at least one material being odorless, tasteless and capable of preventing bacteria growth thereon.

12. The hand tool apparatus according to embodiments 1-11, wherein the grip portion is constructed out of at least one of a silicone, a rubber/elastomer, and a plastic material.

13. The hand tool apparatus according to embodiments 1-12, wherein the grip portion is constructed out of a silicone having a shore hardness of 20-35+/−5 on the Shore A scale.

14. The hand tool apparatus according to embodiments 1-13, wherein the grip portion is constructed as an elongate, substantially cylindrical-shaped structure.

15. The hand tool apparatus according to embodiments 1-14, wherein an outer surface of the grip portion is textured for improving grip.

16. The hand tool apparatus according to embodiments 1-15, wherein the instrument portion is integral with or otherwise permanently engaged with the corresponding handle end.

17. The hand tool apparatus according to embodiments 1-16, wherein the instrument portion is removably engagable with the corresponding handle end.

18. The hand tool apparatus according to embodiments 1-17, wherein at least one of the handle ends provides a tool receiver configured for removably receiving a shank of the instrument portion.

19. The hand tool apparatus according to embodiments 1-18, wherein the tool receiver is constructed out of at least one of a relatively lightweight metal, a polycarbonate, and a plastic material.

20. The hand tool apparatus according to embodiments 1-19, wherein the at least one tool receiver is substantially encased within the grip portion.

21. A hand tool apparatus comprising: an elongate, adaptive ergonomic handle portion comprising: a pair of opposing handle ends; at least one of the handle ends providing an instrument portion; an at least one bendable core extending between the handle ends, the at least one core capable of being selectively bent into a variety of desired shape configurations, and substantially maintaining those shape configurations until the core is intentionally bent into a different desired shape configuration; and a deformable grip portion encasing the at least one core; whereby, the handle portion is capable of ergonomically conforming to a hand of a user while shifting a weight of the apparatus and encouraging proper positioning of the instrument portion during use of the apparatus, regardless of the specific procedure to be performed using the apparatus.

22. A hand tool apparatus comprising: an elongate, adaptive ergonomic handle portion comprising: a pair of opposing handle ends; at least one of the handle ends providing a tool receiver configured for removably receiving a shank of an instrument portion; an at least one bendable core extending between the handle ends, the at least one core capable of being selectively bent into a variety of desired shape configurations, and substantially maintaining those shape configurations until the core is intentionally bent into a different desired shape configuration; and a deformable grip portion encasing the at least one core; whereby, the handle portion is capable of ergonomically conforming to a hand of a user while shifting a weight of the apparatus and encouraging proper positioning of the instrument portion during use of the apparatus, regardless of the specific procedure to be performed using the apparatus.

In closing, regarding the exemplary embodiments of the present invention as shown and described herein, it will be appreciated that a hand tool apparatus having an adaptive ergonomic handle is disclosed. Because the principles of the invention may be practiced in a number of configurations beyond those shown and described, it is to be understood that the invention is not in any way limited by the exemplary embodiments, but is generally directed to a hand tool apparatus having an adaptive ergonomic handle and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A hand tool apparatus comprising:
   an elongate, adaptive ergonomic handle portion comprising:
   a pair of opposing rigid handle ends; and
   an at least one bendable core extending between the handle ends, the at least one core constructed as at least one of a multi-stranded wire-shaped structure or a coil-shaped structure so as to be capable of being selectively bent into a variety of desired shape configurations, and substantially maintaining those shape configurations until the core is intentionally bent into a different desired shape configuration; and
   at least one instrument portion extending from at least one of the handle ends.

2. The hand tool apparatus of claim 1, wherein each of the pair of opposing handle ends comprises a rigid structure, and the adaptive ergonomic handle portion is constructed out of a material or combination of materials that are repeatably heat sterilizable.

3. The hand tool apparatus of claim 2, wherein the handle portion further comprises a resilient grip portion encasing the at least one core, the resilient grip portion and at least one core creating a flexible portion, and the flexible portion capable of being selectively bent into a variety of desired shape configurations, and substantially maintaining those shape configurations until the core is intentionally bent into a different desire shape configuration.

4. The hand tool apparatus of claim 3, wherein the grip portion extends less than an entire length of the handle portion.

5. The hand tool apparatus of claim 3, wherein the grip portion extends an entire length of the handle portion and encases the pair of opposing handle ends.

6. The hand tool apparatus of claim 5, wherein the grip portion is constructed out of an at least one material that is thermally insulated.

7. The hand tool apparatus of claim 5, wherein the grip portion is constructed out of an at least one material that is compatible with human tissue and body fluids, with said at least one material being odorless, tasteless and capable of preventing bacteria growth thereon.

8. The hand tool apparatus of claim 5, wherein the core is constructed out of at least one of a 316LVM 0.064 annealed stainless alloy, a 316LVM 0.072 super annealed stainless alloy, or a MP35N stainless alloy.

9. The hand tool apparatus of claim 5, wherein the instrument portion is permanently engaged with the corresponding handle end.

10. The hand tool apparatus of claim 5, wherein the instrument portion is removably engagable with the corresponding handle end.

11. The hand tool apparatus of claim 2, wherein the rigid structure has a variable outer diameter along a length of the rigid structure.

12. The hand tool apparatus of claim 11, wherein the grip portion is constructed out of a silicone having a shore hardness of 20-35+/−5 on the Shore A scale.

13. The hand tool apparatus of claim 11, wherein an outer surface of the grip portion is textured for improving grip.

14. The hand tool apparatus of claim 11, wherein the rigid structure comprises a serrated surface.

15. The hand tool apparatus of claim 1, wherein at least one of the handle ends provides a tool receiver configured for removably receiving a shank of the instrument portion.

16. The hand tool apparatus of claim 15, wherein the tool receiver comprises a rigid structure having a variable outer diameter creating a bulbous profile with a serrated surface.

17. The hand tool apparatus of claim 1, wherein the at least one instrument portion is at least one of a dental curette, a mirror, a periodontal curette, a surgical curette, an elevator, a micro surgery instrument, a carving instrument, a bone file, an excavator, a root tip pick, extraction forceps, an endodontic instrument, a cavity preparation instrument, and a brush.

18. A hand tool apparatus comprising:
a pair of opposing handle ends, wherein the pair of opposing handle ends are rigid;
at least one of the handle ends providing an instrument portion;
an at least one bendable core extending between the handle ends, the at least one bendable core comprising a coil shape structure; and
a resilient grip portion encasing the at least one core in the coil shape structure, the at least one core in the coil shape structure and resilient grip portion defining a bendable section capable of being selectively bent into a variety of desired shape configurations, and substantially maintaining those shape configurations until the bendable section is intentionally bent into a different desired shape configuration.

19. A hand tool apparatus comprising:
a pair of opposing handle ends, wherein the pair of opposing handle ends are rigid;
at least one of the handle ends providing a tool receiver configured for removably receiving a shank of an instrument portion;
an at least one bendable core extending between the handle ends, the at least one bendable core constructed as a coil shape structure; and
a resilient grip portion encasing the at least one core, the at least one core and resilient grip portion defining a bendable section, the bendable section capable of being selectively bent into a variety of desired shape configurations, and substantially maintaining those shape configurations until the bendable section is intentionally bent into a different desired shape configuration.

* * * * *